(12) United States Patent
Kountouris et al.

(10) Patent No.: US 11,212,232 B2
(45) Date of Patent: Dec. 28, 2021

(54) TRANSMISSION AND RECEPTION OF A DATA STREAM

(71) Applicant: ORANGE, Issy-les-Moulineaux (FR)

(72) Inventors: Apostolos Kountouris, Chatillon (FR); Philippe Surbayrole, Chatillon (FR); Marion Dumay, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/624,633

(22) PCT Filed: Jun. 14, 2018

(86) PCT No.: PCT/FR2018/051402
§ 371 (c)(1),
(2) Date: Dec. 19, 2019

(87) PCT Pub. No.: WO2018/234661
PCT Pub. Date: Dec. 27, 2018

(65) Prior Publication Data
US 2020/0220818 A1 Jul. 9, 2020

(30) Foreign Application Priority Data
Jun. 23, 2017 (FR) ...................................... 1755766

(51) Int. Cl.
*H04L 12/825* (2013.01)
*H04L 12/815* (2013.01)
*H04L 12/801* (2013.01)

(52) U.S. Cl.
CPC .............. *H04L 47/25* (2013.01); *H04L 47/22* (2013.01); *H04L 47/34* (2013.01)

(58) Field of Classification Search
CPC ....... H04L 47/365; H04L 47/25; H04L 47/34; H04L 47/22; H04L 12/825; H04L 12/815;
(Continued)

(56) References Cited

U.S. PATENT DOCUMENTS 6,246,701 B1 * 6/2001 Slattery ............ H04N 21/23406
370/503
7,023,932 B2 * 4/2006 Bobier ................ H04L 27/0004
375/271

(Continued)

FOREIGN PATENT DOCUMENTS

WO 0249291 A1 6/2002

OTHER PUBLICATIONS

English translation of the Written Opinion of the International Searching Authority dated Sep. 28, 2018 for corresponding International Application No. PCT/FR2018/051402, filed Jun. 14, 2018.

(Continued)

*Primary Examiner* — Man U Phan
(74) *Attorney, Agent, or Firm* — David D. Brush; Westman, Champlin & Koehler, P.A.

(57) ABSTRACT

A method for transmitting a data stream containing a second ordered sequence of numerical values, which sequence is determined from a first ordered sequence, a second succession of consecutive numerical values of the second sequence being obtained from a corresponding succession of consecutive numerical values of the first sequence. The method estimates a load value representative of a current load on the network, to determine, depending on the estimated value, a second succession to be transmitted in a predefined time interval following the current time, the second succession being a corresponding first succession of the first sequence or a succession modified by applying a selection law to the bits of the first succession and to transmit the second succession and, in case of transmission of a modified succession, a processing indicator signaling a succession modification.

12 Claims, 5 Drawing Sheets

(58) Field of Classification Search
CPC .. H04L 12/801; H04W 12/126; H04W 12/06; H04W 12/121; H04W 12/106
USPC .......................................................... 370/235
See application file for complete search history.

(56) References Cited

U.S. PATENT DOCUMENTS

| | | | | |
|---|---|---|---|---|
| 7,065,482 | B2* | 6/2006 | Shorey | H04L 43/00 703/2 |
| 7,417,991 | B1* | 8/2008 | Crawford | H04L 41/5009 370/231 |
| 7,764,791 | B2* | 7/2010 | LeComte | H04N 21/4405 380/210 |
| 7,817,730 | B2* | 10/2010 | Chow | H04L 27/2607 375/260 |
| 8,229,117 | B2* | 7/2012 | Lecomte | H04N 21/835 380/239 |
| 8,270,402 | B2* | 9/2012 | Lecomte | H04N 21/4532 370/389 |
| 8,903,089 | B2* | 12/2014 | Lecomte | H04N 19/88 380/216 |
| 9,131,033 | B2* | 9/2015 | Chen | H04N 21/2381 |
| 10,116,651 | B2* | 10/2018 | Penny | H04L 63/00 |

OTHER PUBLICATIONS

International Search Report dated Sep. 17, 2018 for corresponding International Application No. PCT/FR2018/051402, filed Jun. 14, 2018.

Written Opinion of the International Searching Authority dated Sep. 17, 2018 for corresponding International Application No. PCT/FR2018/051402, filed Jun. 14, 2018.

David W. Petr et al., "Priority Discarding of Speech in Integrated Packet Networks", IEEE Journal on Selected Areas in Communications, Jun. 30, 1989 (Jun. 30, 1989)m XP055212414.

H. T. Le, V. D. Nguyen, P. N. Nam, T. C. Thang, A. T. Pham, entitled "Buffer-based bitrate adaptation for adaptive http streaming", Proc. of IEEE ATC2013, pp. 33-38, Oct. 2013.

* cited by examiner

TRANSMISSION AND RECEPTION OF A DATA STREAM

CROSS-REFERENCE TO RELATED APPLICATIONS

This application is a Section 371 National Stage Application of International Application No. PCT/FR2018/051402, filed Jun. 14, 2018, the content of which is incorporated herein by reference in its entirety, and published as WO 2018/234661 on Dec. 27, 2018, not in English.

FIELD OF THE DISCLOSURE

The invention relates to the field of telecommunications.

The invention more particularly relates to the transmission, by an emitting device, and to the reception, by a receiving device, in real-time and without interruption, of a continuous data stream via a communication network.

BACKGROUND OF THE DISCLOSURE

Many systems allow such a data transmission.

Among these systems, systems allowing audiovisual data streams to be sent to one or more receiving devices in real-time using a protocol of streaming type in particular exist. As the stream is received, the receiving device, optionally after decoding the data of the received stream, is able to display the received data on a display screen of the rendering device. By virtue of this system, a user may thus watch a broadcasted film.

In these systems, the data stream is transmitted with a predefined transfer rate.

However, the load on the network may vary over time. At times at which the network is loaded, the bandwidth available to transmit this data stream is decreased. This may lead to situations in which certain data of the stream do not reach the receiving device. These data are then lost. Thus, the continuity of the stream is broken. This for example results in frozen images or abrupt jumps on the screen of the receiving device.

In a certain number of applications, this loss of data may be prejudicial to the user of the receiving device.

This is in particular the case when the transmitted data are data collected by sensors then transferred to a receiving device via a communication network for processing. In this type of application, loss of continuity is a major drawback.

SUMMARY

One of the aims of the invention is to remedy the insufficiencies/drawback of the prior art and/or to make improvements thereto.

To this end, the invention relates to a method for transmitting, via a communication link, a data stream representing a second ordered succession of digital values, said second succession being determined from a first ordered succession of digital values respectively represented by a predefined number of bits, a sequence of consecutive digital values of the second succession, called the second sequence, being obtained from a corresponding sequence of consecutive digital values of the first succession, called the first sequence.

According to the invention, the method comprises the following steps, which are implemented by a transmitting device:

estimating, at a current time, a value representative of a current load on said link;

determining, depending on the estimated load value, a second sequence to be transmitted in a predefined time interval following said current time, said second sequence being a corresponding first sequence of the first succession or a modified sequence obtained by applying a selection law to the bits of said first sequence;

transmitting said second sequence; and transmitting a processing indicator signaling a sequence modification, in case of transmission of a modified sequence.

The data of the first succession are for example data obtained by digitally encoding a radio band of given width.

However, there is no limitation on the nature of these data.

A value representative of the current load on the network, and more precisely on the communication link, is determined at a current time. This value is representative of the capacity of the network to transport, at said current time, data, without loss thereof, over the communication link. Therefore, this value is dependent on the data transfer rate able to be accepted by the network at this current time, i.e. the bandwidth available for the transfer of these data.

As is known, the bandwidth and, therefore, the transfer rate available for the transfer of the data decreases when the network is disrupted or congested.

The transmission method is thus able to transmit, in the form of a continuous stream, data sequences obtained from data sequences of a first data succession.

Depending on the estimated load value, a considered first sequence is transmitted with or without modification.

A modified sequence is a sequence containing only some of the bits of the first sequence.

The modification may decrease the volume of data of the sequence.

For example, in the case where the transfer rate is estimated to be sufficient, all the data of a considered sequence of digital values, called the first sequence, of the first succession are transmitted.

If it is determined that the transfer rate is insufficient, only some of these data are transmitted.

The application of the selection law to a first sequence of data allows a sequence of modified data, called the second sequence, to be obtained.

The selection law is a function allowing bits to be selected from a set of bits and, more specifically here, the bits of a first sequence.

The selection law is for example a function allowing a predefined number of digital values and/or a predefined number of bits for these digital values to be selected among a set of digital values represented via a predefined number of bits.

By virtue of the application of the selection law to the first sequence, the volume of data of the second sequence is decreased with respect to that of the first sequence. The second sequence is transmitted instead of the first sequence, which would have been transmitted if the transfer rate were estimated to be sufficient.

The decreased volume of data is obtained by decreasing the number of digital values of the first sequence and/or by decreasing the number of bits per digital value.

The number of digital values is for example decreased by modifying a sampling rate of the digital values, for example by decimation.

The decrease in the number of bits per digital value is for example obtained by rounding or truncation.

A combination of the two methods (decrease of the number of digital values and of the number of bits of each digital value) allows a greater reduction in the volume of the data.

The second sequence is transmitted during a predefined time interval consecutive to the time of the estimation. The transmitted volume is thus altered in real time.

Thus, the method allows the probability that the network will become congested to be decreased. The transmitted data thus have more chance of reaching the destination device without loss of the continuity of the stream.

The decrease in the volume of transmitted data allows the transfer rate of the stream to be decreased so that it is lower than or equal to the available bandwidth.

A processing indicator is transmitted in association with the one or more transmitted sequences. This indicator allows a receiving device able to receive the transmitted stream, to identify the one or more performed transformations. It also allows, as described below, a succession of data the volume of which is identical to that of the first succession (same number of digital values and same number of bits per digital value) to be reconstructed.

Thus, the functional features (in number of values per unit time and size in bits per value) of the data of the succession thus reconstructed are the same as those of the data of the first succession.

However, depending on the alteration made by the transmitting device, the quality of the data following reconstruction may be lower and at most equal to the quality of the initial data. Quality may be understood as being an indication of the amount of information extractable from a volume of the data.

Thus, the transmitting method allows, in real time and without loss of continuity, a stream of data to be transmitted via a network the load on which may fluctuate.

The network may be a public network, a shared network, etc.

There is no limitation on the type of network.

The data are transmitted using a network streaming protocol, located in the transport layer and above (in the sense of layers of the OSI (Open Systems Interconnection) model).

According to one particular embodiment of the transmitting method, the selection law defines a number of digital values and/or a number of bits of the digital values of the sequence to be transmitted.

According to one particular embodiment, the transmitting method comprises a step of comparing the estimated load value with at least one predefined threshold value and wherein the second sequence is a first sequence that is modified or not modified depending on the result of said comparison.

The comparison of a load value measured at a current time with one or more load threshold values is a simple means of detecting a variation of the load on the network.

Depending on the result of the comparison, it is decided whether or not to transmit all the data of a provided sequence or a modified sequence containing only some of these data.

The comparison with a load threshold value for example makes it possible to determine whether the transfer rate has been estimated to be sufficient or not.

According to one particular embodiment of the transmitting method, the applied selection law is chosen, depending on the estimated load value, from among a plurality of selection laws stored beforehand respectively in association with at least one criterion relative to at least one predefined threshold value.

The provision of a plurality of load threshold values and of a plurality of selection laws, associated with criteria relative to one or more load threshold values, allows the transmitting device to suitably select the data to obtain data the volume of which is decreased commensurately to the drop in the transfer rate delivered by the network. Thus, it is possible to apply a first selection operation that slightly decreases the volume of data of a provided first sequence if the saturation of the network is low or to apply a second selection operation that greatly decreases the volume of data of a provided first sequence if the saturation of the network is high.

One of the threshold values may also be provided with a view to allowing a transformation operation other than a selection, for example filtering or averaging, to be applied when the network is detected as being very greatly disrupted.

The transfer rate of the transmitted stream thus varies over time, up and down depending on the applied transformations.

A high threshold-load-value number allows fine alteration of the transfer rate of the transmitted stream. This in particular allows a stream of maximum quality to be transmitted without loss of the continuity of the stream.

According to one particular embodiment of the transmitting method, the second succession is transmitted in the form of packets, a packet containing a header zone and a data zone, the digital values of the second sequence being included in the data zone and the processing indicator being included in the header zone.

The introduction of the processing indicator into the header of a data packet is a simple means of signaling to the device that receives the data that modifications have been made to the data contained in the packet.

According to one particular embodiment of the transmitting method, the processing indicator is transmitted in a signaling channel of the communication link.

The transmission of the processing indicator is another simple means of signaling a modification of the data of a sequence.

According to one particular embodiment of the transmitting method, the number of bits of the digital values of the second sequence is lower than the number of bits of the digital values of the first sequence and wherein the digital values of the second sequence contain the most-significant bits of the digital values of the first sequence.

The decrease in the size of each digital value, i.e. the number of bits of each digital value, allows the transmitted volume of data to be decreased.

Only the most-significant bits are transmitted.

The device that receives the data, since it knows the nominal number of bits of the digital values, may obtain digital values containing the initial number of bits, i.e. the number of bits that there were before the selection law was applied by the transmitting device, by adding least-significant bits of predefined value, for example of the value of zero. The obtained values will be of the same order of magnitude as the initial values. The loss of information is low.

According to one particular embodiment of the transmitting method, the estimating, determining and transmitting steps are reiterated.

The reiteration of these steps makes it possible to best match the current transporting capacities of the network, i.e. its load. It thus allows the volume of the transmitted data to be decreased as soon as a drop in transfer rate is detected or in contrast the initial volume to be returned to as soon as the network once again becomes unsaturated.

According to one particular embodiment of the transmitting method, said digital values are samples of at least one radio signal.

The invention also relates to a device for transmitting, via a communication link, a data stream representing a second ordered succession of digital values respectively represented by a predefined number of bits, said second succession being determined from a first ordered succession of digital values of predefined size, a sequence of consecutive digital values of the second succession, called the second sequence, being obtained from a corresponding sequence of consecutive digital values of the first succession, called the first sequence.

According to the invention, the transmitting device comprises:

an estimating module configured to estimate, at a current time, a load value representative of a current load on said network;

a processing module configured to determine, depending on the estimated load value, a second sequence to be transmitted in a predefined time interval following said current time, said second sequence being a corresponding first sequence of the first succession or a modified sequence obtained by applying a selection law to the bits of said first sequence; and a transmitting module configured to transmit said second sequence and to transmit a processing indicator signaling a sequence modification, in case of transmission of a modified sequence.

The transmitting device has the same advantages as those mentioned above with respect to the transmitting method.

The invention also relates to a method for obtaining a data stream representing a third ordered succession of digital values respectively represented by a predefined number of bits.

The method comprises the following steps, which are implemented by a receiving device:

receiving, via a communication link, at least one sequence of digital values, called the second sequence, of a data stream representing a second ordered succession of digital values and receiving, in case of reception of a modified sequence, at least one processing indicator signaling a sequence modification, said second sequence being determined depending on an estimated load value, said second sequence being a sequence of consecutive digital values of a first succession of digital values respectively represented by said predefined number of bits, called the first sequence, or a sequence obtained by applying a selection law to the bits of said first sequence; and determining, depending on said at least one second sequence, at least one sequence of digital values of the third succession, called the third sequence, said third sequence being the second sequence or a sequence obtained by applying a predefined transformation to the second sequence depending on said processing indicator.

By virtue of the processing indicator received in association with the data of the sequences, the obtaining device, which receives the data stream containing the second succession, may reconstruct a succession of data, called the third succession, containing as many bits as the first succession.

The transformation applied in the case where a modified sequence is signaled is a predefined transformation depending on the applied selection law.

The processing indicator may indicate which selection law was applied, for example in the form of a value selected from among a plurality of predefined values. By virtue of this value, the device then knows which transformation among a plurality of predefined transformations to apply.

In the case where the transfer rate of the network remains at the nominal transfer rate, the obtained third succession is the first succession. There is then no loss of information.

When an increase in the load on the network is detected, meaning that the transfer rate of the network could potentially have dropped, the received sequences are modified sequences. The corresponding sequences of the third succession are reconstructed sequences. The volume of the data of the third succession is the same as that of the first succession. Only a few added bits may be different.

The alteration of the volume of transmitted data depending on the estimated load on the network allows the probability of loss of packets and therefore of the loss of continuity of the stream to be decreased.

The difference between the first succession and the third succession is dependent on the transformation operations applied to the first succession.

The invention also relates to a device for obtaining a data stream representing a third ordered succession of digital values respectively represented via a predefined number of bits.

The receiving device in particular comprises:

a receiving module configured to receive, via a communication link, at least one sequence of digital values, called the second sequence, of a data stream representing a second ordered succession of digital values and at least one processing indicator signaling a sequence modification, in case of reception of a modified sequence, said second sequence being determined depending on an estimated load value, said second sequence being a sequence of consecutive digital values of a first ordered succession of digital values respectively represented via said predefined number of bits, called the first sequence, or a sequence obtained by applying a selection law to said first sequence, said selection law defining a number of digital values and/or a number of bits of the digital values of the sequence of the second succession;

a reconstructing module configured to determine, depending on said at least one second sequence, at least one sequence of digital values of a third succession, called the third sequence, said third sequence being the second sequence or a sequence obtained by applying a transformation to the second sequence depending on said processing indicator.

The obtaining device has the same advantages as those mentioned above with respect to the obtaining method.

The invention also relates to a system comprising a transmitting device and a receiving device such as described above.

The invention also relates to a computer-program product containing instructions for implementing a transmitting method or an obtaining method such as described above, when this program is executed by a processor.

The invention thus relates to a software package or program capable of being executed by a computer or by a data processor, this software package/program containing instructions for commanding the execution of the steps of a transmitting method or an obtaining method. These instructions are intended to be stored in a memory of a computational device, loaded then executed by a processor of this computational device.

This software package/program may use any programming language, and take the form of source code, object code or code intermediate between source code and object code, such as in a partially compiled form, or any other desirable form.

The computational device may be implemented by one or more physically separate machines and have on the whole the architecture of a computer, and include the components of such an architecture: one or more data memories, one or more processes, communication buses, one or more hardware interfaces for the connection of this computational device to a network or another piece of equipment, one or more user interfaces, etc.

The invention also relates to an information medium readable by a data processor, and containing the instructions of a program such as mentioned above. The information medium may be any entity or device capable of storing the program.

BRIEF DESCRIPTION OF THE DRAWINGS

Other particularities and advantages of the present invention will become apparent from the following description of embodiments that are given by way of nonlimiting example, with reference to the appended drawings, in which.

DETAILED DESCRIPTION OF ILLUSTRATIVE EMBODIMENTS

The invention is implemented by means of software and/or hardware components. In this light, the term "module" may correspond in this document either to a software component, or to a hardware component or to a set of hardware and/or software components, able to perform a function or a set of functions, as described below with respect to the module in question.

A software component corresponds to one or more computer programs, one or more sub-programs of a program, or more generally to any element of a program or of a software package. Such a software component is stored in memory then loaded and executed by a data processor of a physical entity (terminal, server, gateway, set-top box, router, etc.) and is capable of accessing the hardware resources of this physical entity (memories, storage media, communication buses, input/output electronic boards, user interfaces, etc.).

In the same way, a hardware component corresponds to any element of an item of hardware. It may be a question of a programmable hardware component or of a hardware component with an integrated processor for executing software, for example an integrated circuit, a chip card, an electronic board for executing a firmware package, etc.

A first embodiment of a transmitting method and of a receiving method will now be described with reference to FIGS. 1 to 3.

Figure 1:
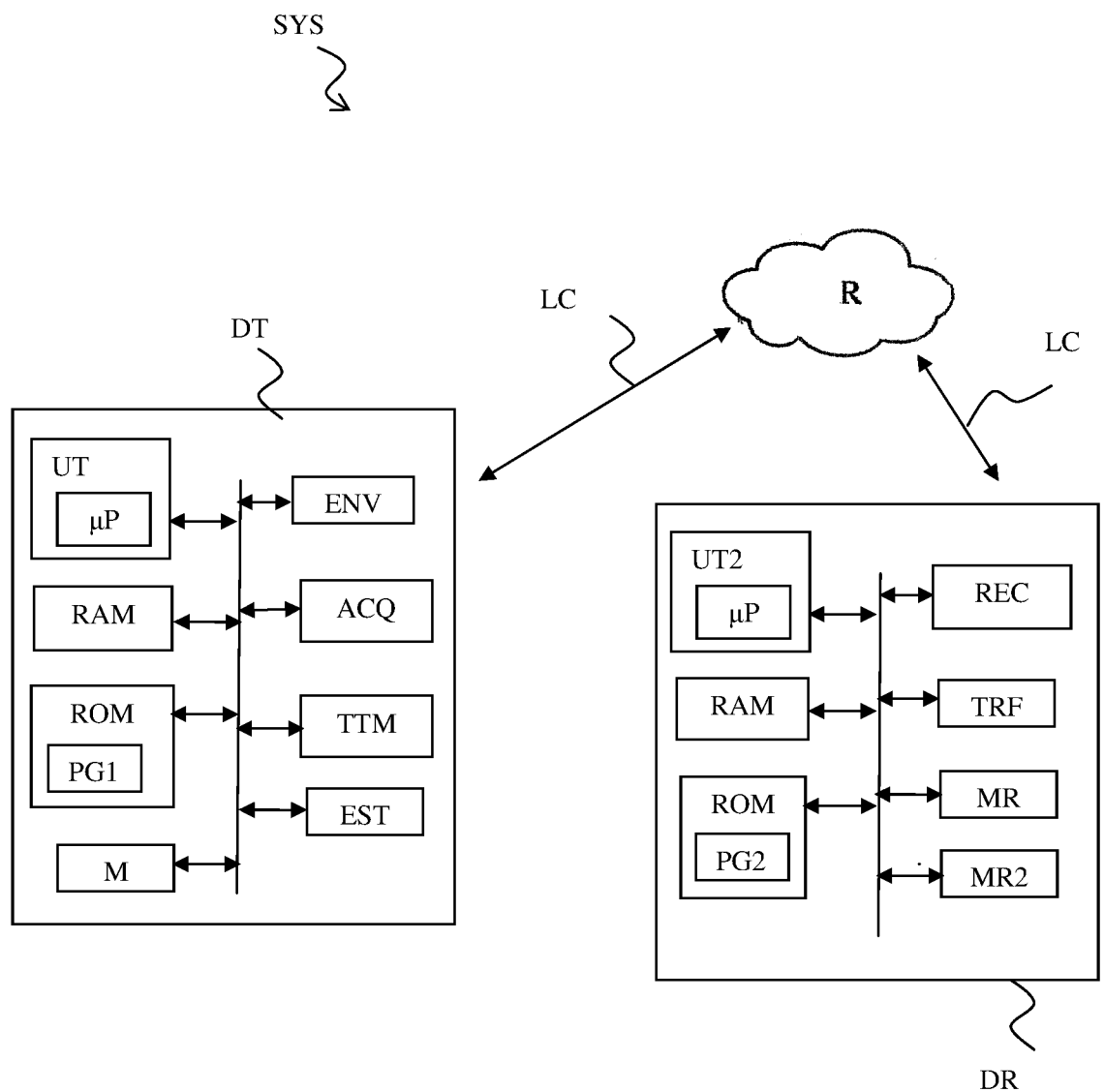
FIG. 1 is a schematic illustrating a system according to a first embodiment of the invention.
Figure 2:
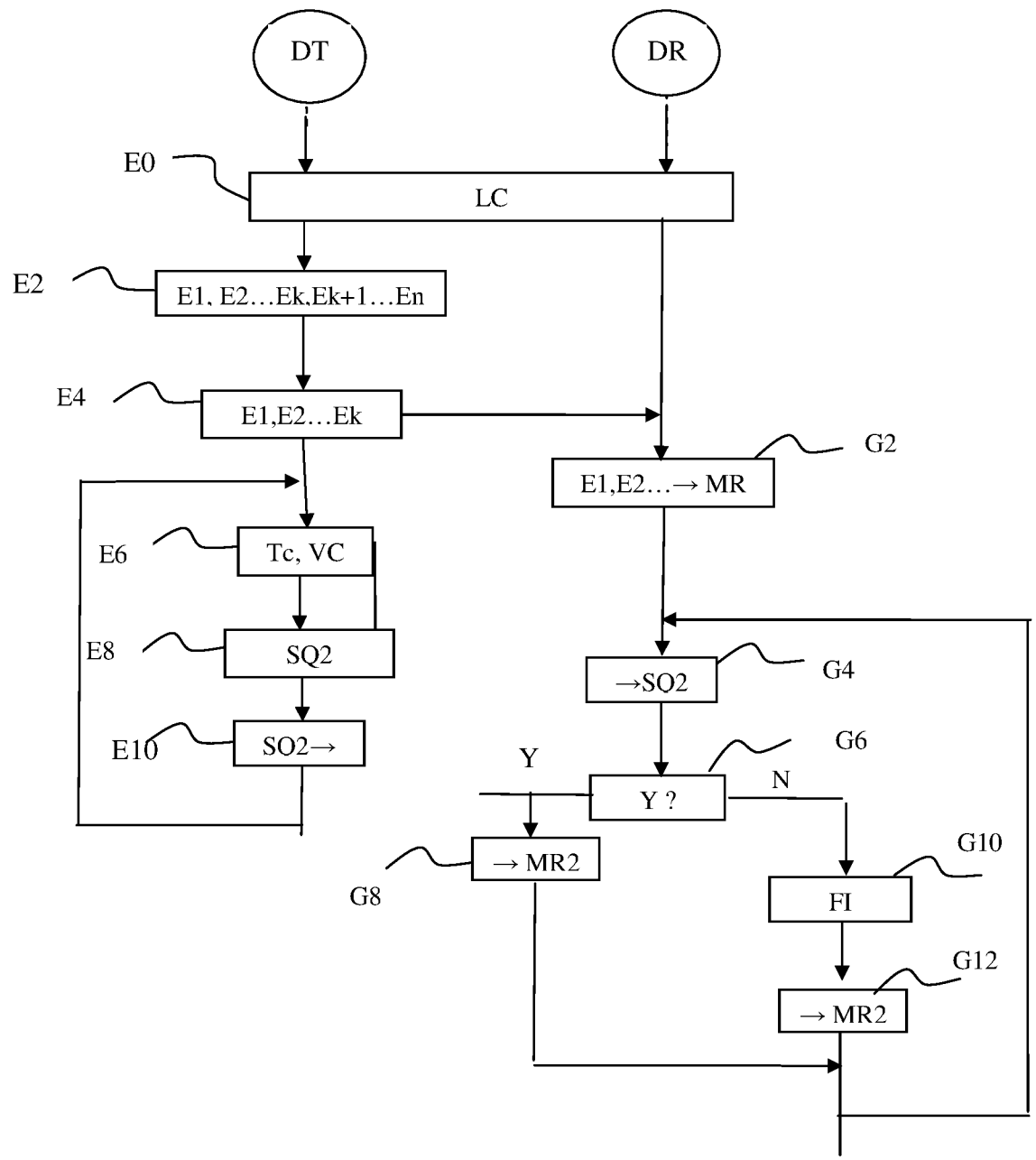
FIG. 2 is a flowchart illustrating the various steps of a transmitting method and of an obtaining method according to a first embodiment of the invention.

With reference to FIG. 1, a system SYS comprises a transmitting device DT and a receiving device DR that are able to communicate with each other via a communication network R.

The network R is for example a telecommunication network in which the data are transmitted in the form of packets. As is known, a packet comprises a header zone and a data zone the data of which are generally called "useful data".

The network R is for example a network such as the Internet, an intranet, a local network, etc.

The transmitting device DT and the receiving device DR are for example pieces of equipment of "computer" type.

The receiving device DR is an obtaining device as understood in the context of the invention.

The transmitting device DT comprises, as known, in particular a processing unit UT equipped with a microprocessor, a read-only memory ROM and a random-access memory RAM.

The read-only memory ROM comprises registers that store a computer program PG1 containing program instructions suitable for implementing a transmitting method according to one embodiment of the invention, which embodiment is described below with reference to FIGS. 2 to 5.

The transmitting device DT also comprises a module ACQ for acquiring data, an estimating module EST, a processing module TTM and an emitting module ENV.

The acquiring module ACQ is here configured to obtain, in real-time, digitized samples of radio signals.

These samples are for example transmitted via one or more devices (not shown) and for example via a Wi-Fi communication link.

The samples are stored immediately after they are obtained by the acquiring module ACQ. They thus form an ordered succession.

The samples are for example received at a predefined rate.

Also, alternatively, the samples are stored by an acquiring device (not shown) in a memory accessible to the transmitting device DT.

The samples represent digital values as meant in the context of the invention.

In the described embodiment, each sample takes the form of a binary succession.

The size of the samples is predefined.

For example, each sample is a succession of 24 bits.

The estimating module EST is configured to determine a value representative of the current load on the network at a current time.

The emitting module ENV is configured to transmit the data via the network R.

The receiving device DR comprises, as known, in particular a processing unit UT2 equipped with a microprocessor, a read-only memory ROM, and a random-access memory RAM.

The read-only memory ROM comprises registers that store a computer program PG2 containing program instructions suitable for implementing an obtaining method according to one embodiment of the invention, which embodiment is described below with reference to FIGS. 2 to 5.

The receiving device DR also comprises a module REC for receiving data and a reconstructing module TRF.

The receiving module REC is configured to receive, in real-time, via the network R, a data stream containing data packets.

A first embodiment of a transmitting method and of an obtaining method implemented in the system SYS will now be described with reference to FIG. 2.

In a prior step E0, a communication link LC is initialized between the transmitting device DT and the receiving device DR.

In this initializing step, the devices exchange signaling messages to set up the communication.

For example, the transmitting device DT determines, depending on the receiving device DR and on the capabilities of the network R, a nominal transfer rate D of the useful data that will be transmitted. The transmitting device DT transmits, to the receiving device DR, the nominal transfer rate of the useful data D and information relative to the useful data that will be transmitted, such as for example a sampling rate and the format of the useful data.

Alternatively, the sampling rate and/or the format of the useful data are transmitted in one or more packet headers.

In a step E2, data E1, E2, ... En are collected by the acquiring module ACQ of the transmitting device DT during a time interval IT1.

The collected data take the form of digital values. Each digital value is a succession of binary data. The size of each digital value is predefined. In other words, the number of bits representing each connected digital value is a predefined value NB.

The collected data are for example data generated by Nyquist digitization of a radio-frequency band.

The collected digital values are stored immediately in a memory M of the transmitting device DT. The memory M is for example a FIFO (First In First Out) memory.

In the described embodiment, the stored data are the collected data.

Alternatively, the collected data are filtered before storage.

The collected data thus form an ordered and continuous succession of digital values.

In the described embodiment, each digital value is a digitized sample of a radio signal.

However, there is no limitation on the type of digital values stored.

Thus, the invention applies to any type of data in so far as these data are all of the same type, of the same format and are expressed via a binary succession of NB bits.

In the rest of the description, these data are referred to either as digital values or samples, the two terms being equivalent in the described embodiment.

The collected digital values represent a first ordered digital succession S1 as meant in the context of the invention.

Alternatively, the acquired data are received in the form of a continuous data stream.

In a step E4, carried out parallel to step E2, with however a delay, the transmitting module ENV of the transmitting device DT transmits, via the network R, and more particularly via the communication link LC, to the receiving device DR, the digital values stored in the memory M. These digital values are transmitted in the order that they are stored. Thus, the digital value collected first E1 is transmitted first.

Conventionally, the digital values are encapsulated in packets before their transmission. As known, the number of digital values per packet is defined in the initializing phase E0.

The digital values are transmitted continuously, at the same rate as they are acquired and stored in the memory M of the transmitting device DT. However, a slight delay required for the processing may be observed.

The digital values transmitted in step E4 are for example the samples E1 to Ek with k<n.

The digital values transmitted in step E4 are received by the receiving module REC of the receiving device DR in a step G2 and recorded in a memory MR of the receiving device DR.

In a step E6, the estimating module EST of the receiving device DR estimates, i.e. determines, a current load value VC.

In the described embodiment, the estimating step E6 is carried out after the step E4 of sending the unmodified samples E1, E2 ... Ek. Alternatively, step E4 is not carried out and step E6 is implemented before any transmission of data by the processing device DT.

The load value VC is representative of the load on the network, i.e. of a current transport capacity of the network R, of the available bandwidth or even of the current transfer rate of the network.

The load value VC is for example determined from one or more measurements of the performance of the network.

In the described embodiment, the estimated load value is a value of the current transfer rate of the network R, i.e. of a volume of useful data able to be transmitted by the network R in a unit of time. The load value VC is for example expressed in the form of a number of bits per second.

As known, when data are sent in the form of packets, the rapidness of the response of the network layer of the transmission device DT depends on the capacity of the network to transmit the samples E1, E2 .... The load value VC is for example determined depending on how rapidly the network layer accepts to send the samples.

Alternatively, the load value VC is for example a number of bits that the network is able to transmit per unit time without loss of quality, i.e. without loss of data between the emission and reception.

Known methods allow a load value to be determined.

For example, some methods use the fullness of a emission-side and reception-side FIFO memory to determine a state of congestion of the network. This indicator may be used to estimate the available transfer rate.

In this respect, mention may for example be made of the document H. T. Le, V. D. Nguyen, P. N. Nam, T. C. Thang, A. T. Pham, entitled "Buffer-based bitrate adaptation for adaptive http streaming", Proc. of IEEE ATC2013, pp. 33-38, October 2013.

Step E6 is carried out at a current time Tc of the time interval IT.

Step E6 is followed by a step E8 in which the processing module TTM of the transmitting device DT determines a sequence SQ2 of the digital values to be transmitted during a time interval I2 following the current time Tc.

The sequence SQ2 represents a second sequence as meant in the context of the invention.

The sequence SQ2 is determined depending on a sequence SQ1 of consecutive still-not-yet-transmitted samples of the first succession S1.

For example, assume that when step E8 is carried out the samples E1 to Ek of the first succession S1 have been transmitted and that the following samples (Ek+1, Ek+2 ... ) have not yet been transmitted. The sequence SQ1 is for example the sequence consisting of the samples Ek+1 to Ek+r.

The sequence SQ2 is also determined depending on the load value VC. Depending on the estimated load value VC, the sequence SQ2 is either the sequence SQ1, or a sequence SQ1m.

More precisely, the processing module TTM of the transmitting device DT determines whether the sequence SQ1 need or need not be modified depending on at least one predefined criterion CR. The criterion CR is relative to the load value VC.

The sequence SQ1M is obtained by applying a predefined selection law F to the sequence SQ1.

The selection law F allows the volume of the data to be transmitted to be decreased.

The number of bits of the sequence SQ1m is lower than the number of bits of the sequence SQ1.

The selection law F is for example a selection law defining a number of samples for the sequence SQ2. In other words, the selection law F is in this case a law allowing a predefined number of samples to be selected from among the samples of a sequence, here the sequence SQ1. In this case, the sequence SQ1m contains only certain samples of the sequence SQ1, for example one sample in two.

Alternatively, the selection law F is a law defining a size of the samples of the sequence SQ2, typically a number of bits of the samples of the sequence SQ2. In this case, the sequence SQ1m contains as many samples as the sequence SQ1 but the number of bits of each sample is lower than the number of bits of the samples of the sequence SQ1.

Also, alternatively, the selection law F defines a number of samples and a number of bits per sample for the samples for the sequence SQ2.

Step E8 is followed by a step E10 in which the transmitting module ENV of the transmitting device DT transmits the sequence SQ2.

Also, in step E10, if the sequence SQ2 is the modified sequence SQ1m, a processing indicator Y is transmitted via the communication network R and via the communication link LC, in association with the sequence SQ2.

The processing indicator Y is inserted into the header of each packet containing the data of the sequence SQ1m.

The processing indicator Y makes it possible to signal to the receiving device DR that the samples of the packet are samples of a modified sequence.

In the case where the sequence SQ2 is the sequence SQ1, no processing indicator is transmitted.

Alternatively, a processing indicator signaling that the sequence has not been modified is transmitted, for example in the header of each packet containing samples of an unmodified sequence.

Alternatively, only the first packet containing samples of a modified sequence contains the processing indicator Y. In this case, provided that the header of the packets does not contain information to the contrary, the transmitted samples are samples of a modified sequence.

Alternatively, the processing indicator Y also indicates the type of selection applied to the data.

The sequence SQ2 is received by the receiving module REC of the receiving device DR in a step G4.

The received samples are stored immediately after they are received by the receiving device DR in the memory MR.

Steps E6 to E10 and G4 are reiterated subsequently, for example at another current time of the time interval IT.

Steps E6 to E10 and G4 are for example reiterated at regular time intervals.

The receiving device DR thus receives in succession a plurality of sequences SQ2.

The data received in step G2 and those received in the steps G4 form a second ordered succession S2 of digital values.

In a step G6, the reconstructing module TRF of the receiving device DR determines whether a processing indicator signaling a modification of the data of the packet by the transmitting device DT is contained in the header of the first received data packet.

In the case where the header does not contain a processing indicator or contains a processing indicator indicating that the data have not been modified, the samples of the packet are stored in a memory MR2 of the receiving device DR without undergoing modification (step G8).

In the case where the header of the packet contains a processing indicator Y indicating that the data of the packet have undergone transformation, the reconstructing module TRF of the receiving device DR applies, to the data of the packet, a transformation FI aiming to obtain a volume of data identical to the volume of data before the selection law F was applied by the transmitting device DT (step G10).

The transformation FI is a predefined mathematical function, associated with the selection law F. The transformation FI is a function that allows the transformation carried out by the transmitting device DT to be reversed as best as possible.

For example, if during the application of the function F1, the sampling rate was modified by decimation, the associated transformation FI may be an interpolation.

If during the application of the function F1, the samples were modified by rounding or truncation, the associated transformation FI may be a function of zero-padding type.

If the applied selection law F aims to select one sample in two, the transformation FI for example consists in adding an identical sample after each sample of the packet.

If the selection law F allows m most-significant bits to be selected from the NB bits of each sample, a sample obtained via the transformation FI is a sample of NB bits in which the most-significant bits are the m bits of the received sample and the other bits are set to a predefined value, for example a value of zero.

The samples obtained following the application of the transformation FI are recorded, in a step G12, in the memory MR2, following the samples stored beforehand in this memory.

An indicator may be stored in association with the stored data in order to signal that a transformation has been applied, i.e. to signal that the data may not be exactly the data obtained by the transmitting device DT.

Steps G6 to G12 are reiterated for each received packet.

Thus, sequences of consecutive samples, whether modified or not, are stored immediately in the memory MR2 of the receiving device DR.

The data thus stored in the memory MR2 form an ordered and continuous succession S3 of samples respectively represented via a number NB of bits.

The obtained succession S3 represents a third succession as meant in the context of the invention.

In the described embodiment, the transmitted packets containing unmodified sequences of samples contain no processing indicator.

Alternatively, before sending, a processing indicator is inserted into the header of the first packet or of all the consecutive packets containing unmodified sequences of samples. The processing indicator in this case signals that no selection has been carried out.

In the embodiment in which a processing indicator is inserted solely into a first data packet of modified sequence, the insertion of a processing indicator signaling that no selection has been performed is in particular indispensable for signaling a first packet without selection consecutive to one or more data packets of modified sequence.

Step E6 of estimating the current load value may be reiterated one or more times. In each reiteration, the current load value is updated. Step E6 is for example repeated at regular intervals.

In the described embodiment, step E6 is carried out after transmission of k samples. Alternatively, step E6 may be carried out before the transmission of the first sample E1.

Steps E0 to E10, which are implemented by the transmitting device DT, are steps of the transmitting method according to one embodiment of the invention.

Steps E0 and G2 to G12, which are implemented by the receiving device DR, are steps of the obtaining method according to one embodiment of the invention.

A first example of an embodiment of the transmitting method and of the obtaining method implemented in the system SYS will now be described with reference to FIGS. 3 and 4.

In this example embodiment, a single selection law F2 is predefined. The selection law F2 is for example a law allowing the 12 most-significant bits of each sample to be selected.

A load threshold value VS has also been predefined and stored in a memory of the transmitting device DT.

In the described embodiment, the current load value VC and the threshold value VS are values of transfer rate, for example expressed in number of bits per second. The current transfer rate is lower than a nominal transfer rate D if the current load value VC is lower than the threshold value VS. The nominal transfer rate is the transfer rate at which the data are transmitted without loss, in particular when the network is not congested. The nominal transfer rate D is for example a transfer rate negotiated during the initialization of the communication link.

Alternatively, the current transfer rate may be considered to be lower than the nominal transfer rate D if the current load value is higher than a predefined threshold value.

Figure 3:
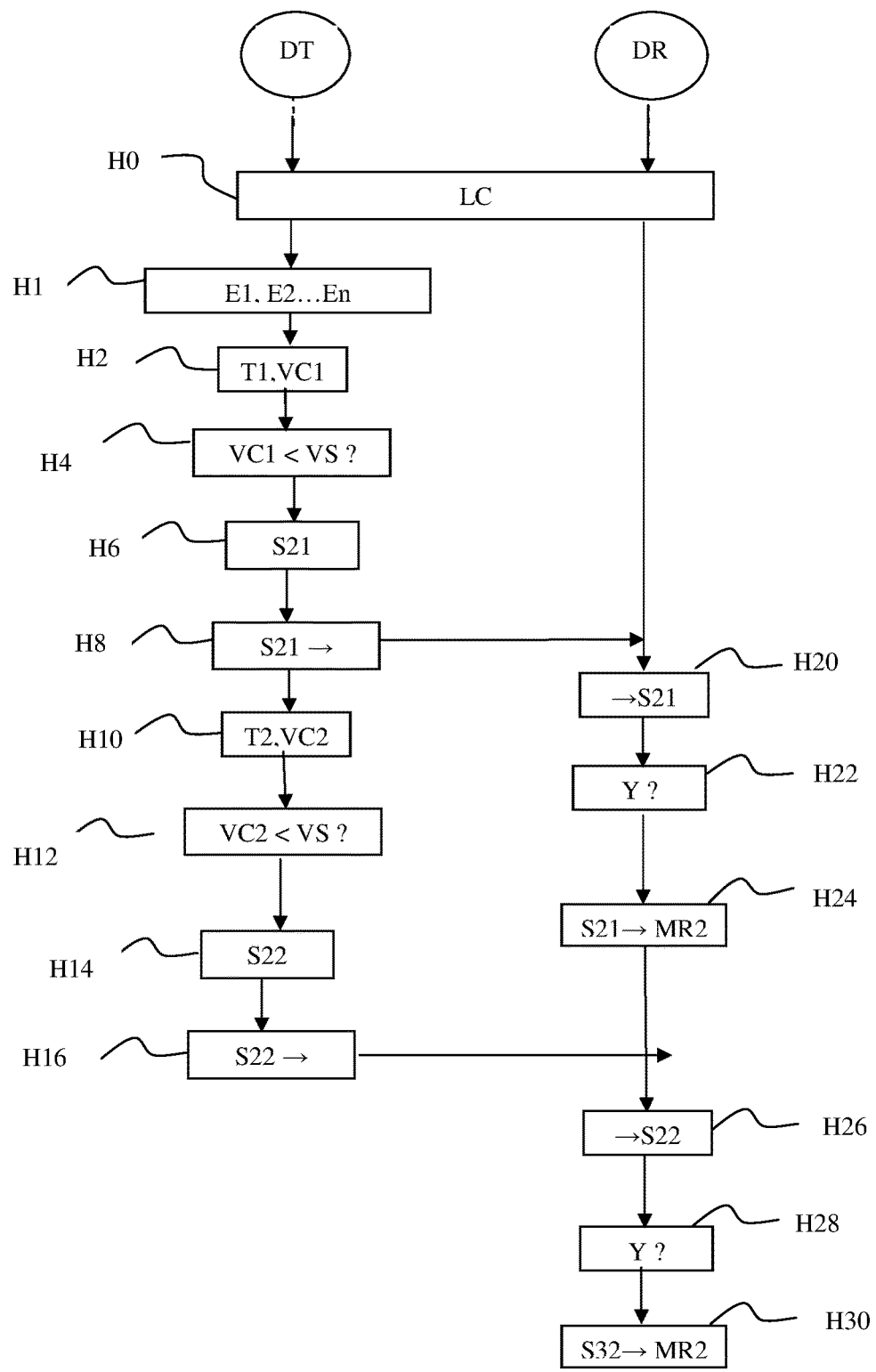
FIG. 3 is a flowchart illustrating the various steps of a transmitting method and of an obtaining method according to a first example embodiment.

With reference to FIG. 3, in a step H0, a communication link LC is initialized between the transmitting device DT and the receiving device DR.

In a step H1, N samples E1, E2 . . . En are collected by the transmitting device DT in a time interval IT1. These N samples forming a first ordered succession S1.

The size of the samples of the succession S1 is for example 24 bits.

Figure 4:
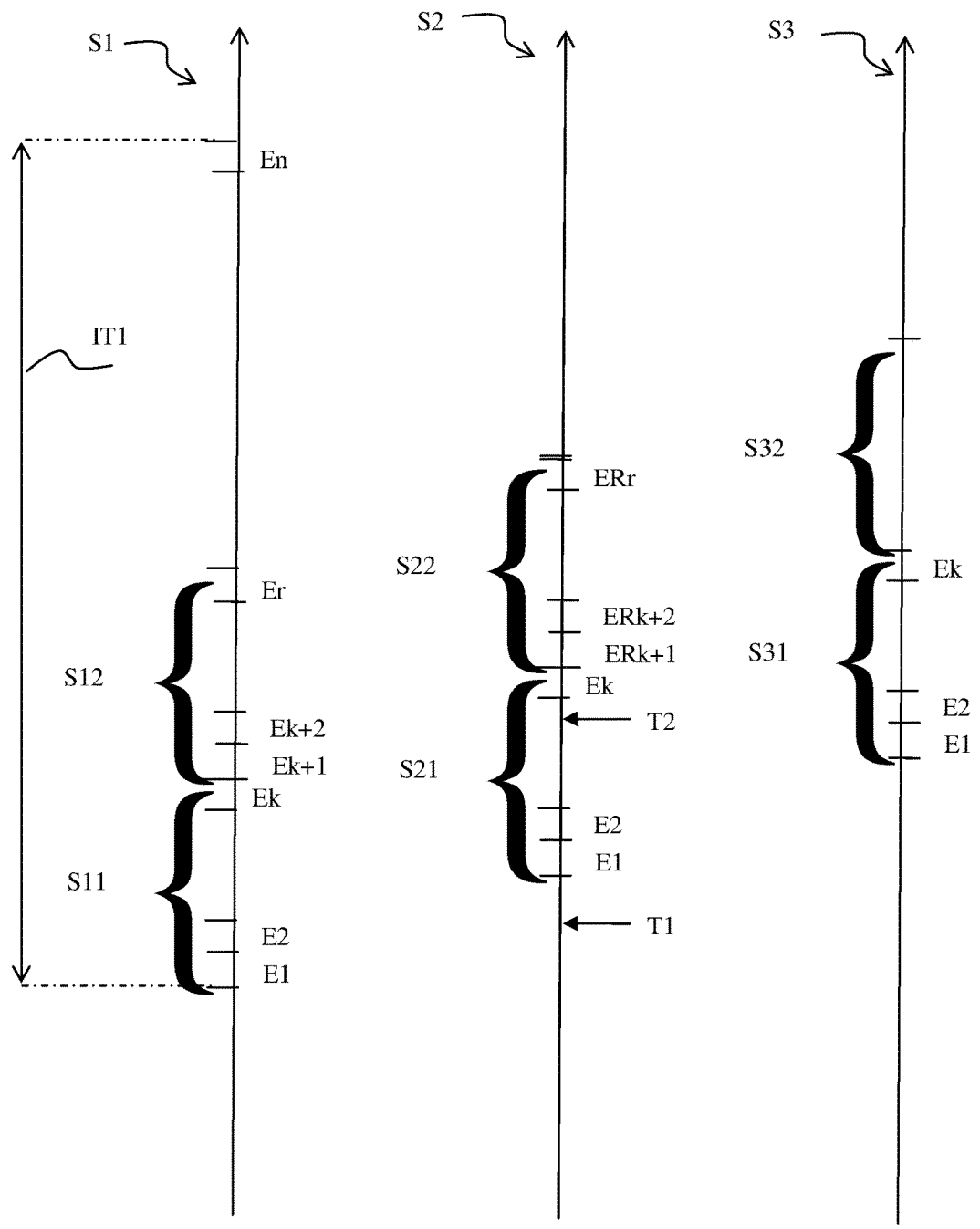
FIG. 4 is a schematic illustrating successions of samples obtained according to a first example embodiment of the invention.

FIG. 4 is a schematic illustrating the succession S1, a first succession S2 obtained from the succession S1 and a third succession S3 obtained by reconstruction from the succession S2.

The succession S1 comprises a plurality of consecutive sequences S11, S12, . . . . Each sequence contains a predefined number of samples collected by the transmitting device DT.

In a step H2, carried out at a current time T1 of the time interval IT1, a load value VC1 is estimated by the transmitting device DT.

In a step H4, the estimated load value VC1 is compared to the predefined threshold value VS.

The load value VC1 is for example such that VS<VC1.

Step H4 is followed by a step H6 in which the transmitting device DT determines a sequence S21 depending on the result of the comparison and depending on a sequence of samples of the succession S1.

The sequence in question of the succession S1 is here a first sequence S11 consisting of the samples E1 to Ek.

Since the current load value VC1 is higher than the threshold value VS, the sequence S21 is identical to the sequence S11.

The sequence S21 is transmitted by the transmitting device DT in one or more data packets, in a step H8.

In a step H10, which is carried out at a second current time T2 of the time interval IT1, a load value VC2 is estimated.

In a step H12, the load value VC2 is compared to the threshold value VS.

The load value VC2 is for example such that VS>VC2.

Step H12 is followed by a step H14 in which the transmitting device DT determines a sequence S22 to be transmitted, from the sequence of samples S12 of the succession S1.

The sequence S12 consists of the k samples Ek+1, Ek+2 . . . Er following the samples of the previously processed sequence S11 of the first succession S1.

Since the current load value VC2 is lower than or equal to the threshold value VS, the transmitting device DT applies the predefined selection law F2 to a plurality of consecutive and not yet transmitted samples of the first succession S1, i.e. here to the sample Ek+1 and the following samples of the sequence S12.

The sequence S22 contains k samples ERk+1, ERk+2 . . . ERr.

Each sample ERi of the sequence S22 consists of the 12 most-significant bits of the sample Ei of the sequence S12.

The predefined selection law F2 is applied to the samples before the transmission thereof, and more precisely before the encapsulation thereof into packets.

The sequence S22 is transmitted by the transmitting device DT in one or more data packets, in a step H16.

In step H16, a processing indicator Y is inserted into each packet of the transmitted sequence S22.

The processing indicator Y signals that the selection law F2 was applied to the packet.

The sequences S21, S22 . . . form a second ordered succession S2.

The second succession S2 is illustrated in FIG. 4.

As illustrated in FIG. 4, the samples of a sequence of the second succession S2 may be determined and transmitted at the rate of acquisition of the samples of the corresponding sequence of the first succession S1. Thus, for example, the first samples Ek+1, Ek+2 of the sequence S22 may be transmitted via the communication link LC, before the transmitting device DT has acquired the last samples Er−1, Er of the sequence S12 of the first succession S1.

The estimating, comparing and determining steps are then reiterated one or more times.

The receiving device DR receives the one or more packets transmitted by the transmitting device DT.

It thus receives, in a step H20, one or more packets containing the samples of the sequence S21.

In a step H22, the receiving device DR analyses the header of the packets received in step H20 and detects that no processing indicator features therein.

In a step H24, the receiving device DR saves the data contained in the packets, i.e. the samples E1, E2 . . . Ek of the sequence S11 in a memory MR2 of the receiving device DR.

The samples E1 to Ek represent a sequence S31 of samples of a third succession S3.

In a step H26, the receiving device DR receives one or more packets containing the samples of the sequence S21 transmitted in step H16.

In a step H28, the receiving device DR analyses the headers of the packets received in step H26 and detects whether they contain the processing indicator Y.

In a step H30, the receiving device DR determines a sequence S32 of data from the data of the sequence S22.

To do this, the receiving device DR applies a transformation FI2 to the data of the sequence S22.

In this example embodiment, the transformation FI2 aims to reconstruct the samples of 24 bits. To do this, each sample of the sequence S22 is for example completed with 12 least-significant bits of a value of zero.

The sequence S32 thus contains as many bits as the corresponding sequence S12 of the succession S1.

The sequences S31, S32 . . . form a third succession S3 as meant in the context of the invention.

A second embodiment of the transmitting method and of the obtaining method implemented in the system SYS will now be described with reference to FIG. 5.

In a prior step, a plurality of selection laws, four for example, have been predefined. Data defining each selection law are respectively stored in association with a criterion relative to at least one predefined load threshold value, in a memory of the transmitting device DT.

One selection law F1 is for example "select two samples in three" and a first associated criterion CR1 is "the estimated load value is comprised between a second load threshold value V2 and a first load threshold value V1".

One selection law F2 is for example "select the 12 most-significant bits of each sample" and a second associated criterion CR2 is the "estimated load value is comprised between a third load threshold value V3 and the second load threshold value V2".

One selection law F3 is for example "select one sample in two and select the 12 most-significant bits of each sample" and a third associated criterion CR3 is "the estimated load value is comprised between a fourth load threshold value V4 and the third load threshold value V3".

One selection law F4 is for example "select one sample in two and select the 12 most-significant bits of each sample after filtering" and a fourth associated criterion CR4 is the "the estimated load value is lower than the fourth load threshold value V4".

In this example embodiment, the load threshold values V1, V2, V3 and V4 are data-transfer values.

Here V4<V3<V2<V1<D, D representing a nominal data-transfer value.

When the transfer rate of the network R is at the nominal value D, all the samples collected by the transmitting device DT are transmitted in real time and continuously without loss of data.

Figure 5:
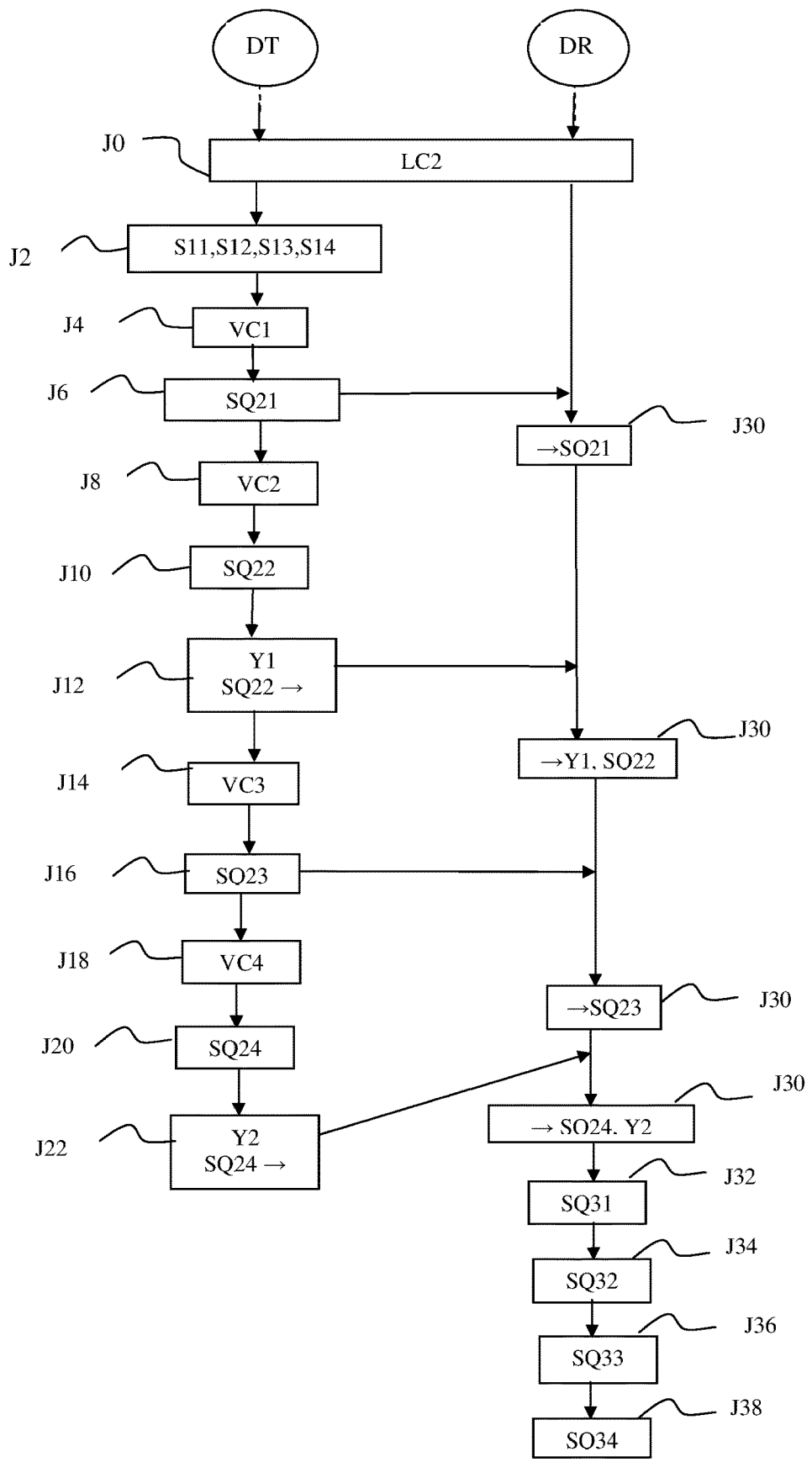
FIG. 5 is a flowchart illustrating the various steps of a transmitting method and of an obtaining method according to a second embodiment of the invention.

With reference to FIG. 5, in a prior step J0, a communication link LC2 is initialized between the transmitting device DT and the receiving device DR.

In a step J2, similar to step E2 of the first embodiment described above, data are collected by the acquiring module ACQ of the transmitting device DT during a time interval IT1.

The collected digital values represent a first ordered digital succession S1 as meant in the context of the invention.

The first succession S1 contains a plurality of samples obtained by the transmitting device DT, during the time interval IT1. The succession S1 here comprises the sequences SQ11, SQ12, SQ13, SQ14 of samples obtained in succession. Each of the sequences for example contains 10 samples.

In a step J4, the transmitting device DT estimates, i.e. determines, at a current time T1 of the time interval IT1, a load value VC1. The load value VC1 is representative of a transport capacity of the network R. The load value VC1 is, in the described embodiment, a value of the current transfer rate of the network R.

The estimated value VC1 is for example such that V1<VC1<D, D being a nominal transfer rate, for example a transfer rate negotiated during the setup of the communication link LC2.

In a step J6, the transmitting device determines whether one of the criteria stored beforehand is met by the load value VC1. To this end, the load value VC1 is compared to the load threshold values V1, V2, V3 and V4 stored beforehand.

The transmitting device DT then determines a sequence SQ21 of digital values to be transmitted.

The sequence SQ21 is determined depending on the sequence SQ11 of consecutive samples of the first succession S1.

Since the estimated load value VC1 is comprised between the values V1 and D, no predefined criterion is met and no selection law is applied to the samples of the sequence SQ11. The determined sequence SQ21 is the sequence SQ11.

The sequence SQ21 is then transmitted, during a time interval I1, via the link LC2.

In a step J8, the transmitting device DT determines, at a second current time T2, a load value VC2. The load value VC2 is for example measured a little before the end of the time interval I1.

The estimated load value VC2 is for example such that V2<VC2<V1.

In a step J10, the transmitting device DT checks whether one of the criteria stored beforehand is met by the load value VC2. Next, it determines a sequence SQ22 of digital values.

The sequence SQ22 is determined depending on the sequence SQ12 of consecutive samples of the first succession S1.

Since criterion CR1 is met by the load value VC2, the selection law F1 is applied to the samples of the sequence SQ12.

The sequence SQ22 is the sequence SQ12 from which two samples in three consecutive samples have been selected.

The sequence SQ22 is then transmitted via the link LC2, in a step J12.

A processing indicator Y1 is inserted into each header of the one or more packets of the sequence S22 before transmission.

The processing indicator Y1 signals that the selection law F1 has been applied to the packet.

Step J12 is carried out during a time interval I3 consecutive to the time interval I2.

In a step J14, which is for example carried out a little before the end of the time interval I2, the transmitting device DT determines, at a third current time T3, a load value VC3.

The estimated value VC3 is for example such that V1<VC3<D.

In a step J16, the transmitting device DT determines a sequence SQ23 of digital values depending on a sequence SQ13 of consecutive samples of the first succession S1.

Since none of the predefined criteria CR1, CR2, CR3 and CR4 are met by the load value VC3, no selection law is applied to the samples of the sequence SQ13 and the sequence SQ23 is the sequence SQ13.

The sequence SQ23 is then transmitted, during a time interval I3, via the link LC2. The interval I3 is consecutive to the interval I2.

In a step J18, the transmitting device DT determines, at a current time T4, a load value VC4. The load value VC4 is for example measured a little before the end of the time interval I3.

The estimated value VC4 is for example such that V2<VC4<V1.

In a step J20, the transmitting device DT determines a sequence SQ24 of digital values depending on a sequence SQ14 of consecutive samples of the first succession S1.

Since the criterion CR2 is met by the load value VC2, the sequence S24 is obtained by applying the selection law F2 to the samples of the sequence SQ14.

The sequence SQ24 is then transmitted via the link LC2 in a step J22.

Also in step J22, a processing indicator Y2 is inserted into each packet header of the sequence SQ24 before transmission.

The processing indicator Y2 signals that the selection law F2 has been applied to the packet.

The sequences SQ21, SQ22, SQ23 and SQ24 represent second sequences as meant in the context of the invention. The sequences here form a second ordered succession of digital values.

The second sequences SQ21, SQ22, SQ23 and SQ24 are received by the receiving device DR at the rate of which they are transmitted (steps J30).

Following the reception of the sequence SQ21, the receiving device DR detects, via analysis of the header of the one or more received packets, that no processing indicator features therein and determines a sequence SQ31 identical to the received sequence SQ21 (step J32).

The receiving device DR then stores the data of the sequence SQ31 in a memory MR2 of the receiving device DR.

Following the reception of the sequence SQ22, the receiving device DR detects, via analysis of the header of the one or more received packets, the presence of the processing indicator Y1 (step J34).

Next, it determines a sequence SQ32. The sequence SQ32 is obtained by applying a transformation FI1 associated with the selection law F1.

The transformation FI1 is a predefined mathematical function associated with the selection law F1.

The sequence SQ32 for example contains the first two samples of the sequence SQ22, followed by the second sample of the sequence SQ22, then the third and fourth samples of the sequence SQ22 followed by the fourth sample of the sequence SQ22, etc. The repetition of the $2^{nd}$, $4^{th}$, etc. samples allows a sequence SQ32 containing the same number of samples as the corresponding sequence SQ31 of the first succession S1 to be obtained.

Next, the receiving device DR stores the data of the sequence SQ32 in the memory MR2.

Following the reception of the sequence SQ23, the receiving device DR detects, via analysis of the header of the one or more received packets, that no processing indicator features therein and determines a sequence SQ33 identical to the received sequence SQ23 (step J36).

The data of the sequence SQ33 are then stored in the memory MR.

Following the reception of the sequence SQ24, the receiving device DR detects, via analysis of the header of the one or more received packets, the presence of the processing indicator Y2 (step J38).

Next, the receiving device DR determines a sequence SQ34. The sequence SQ34 is obtained by applying a transformation FI2 associated with the selection law F2.

The transformation FI2 is a predefined mathematical function associated with the selection law F2.

The sequence SQ34 for example contains the samples of the sequence SQ24, said samples respectively being completed by 12 least-significant bits of a value of zero.

The receiving device DR then stores the data of the sequence SQ34 in the memory MR2.

The sequence SQ34 thus contains as many bits as the corresponding sequence SQ14 of the succession S1.

The sequences SQ31, SQ32, SQ33 and SQ34 are sequences of consecutive samples of the third succession S3.

The invention may for example be implemented in a system comprising a first device and a second device that are able to communicate via a communication link of a network. In this system, the first device is for example a device able to receive, in real-time, a first data stream and to transmit, to the second device, via the communication link, a second stream.

The first stream is for example transmitted by the server.

The nominal transfer rate of the first stream is for example a transfer rate D1.

The second device is for example a device able to receive, in real-time, via the communication link, the second data stream and to transmit, for example to a user terminal, a third stream.

The communication link is configured to transfer the data of the first stream to the second device, immediately after they reach the first device.

Thus, the first stream is transferred without modification when there is no disruption in the network.

In this case, the second device re-transfers, in real-time, the received stream, i.e. the first stream, to the user terminal.

When, at a current time, the first device detects a drop in the transfer rate of the communication link, it applies to the data, before transmission thereof, an operation aiming to decrease the volume of these data, as explained above.

On reception of these data, the second device applies, to these data, an operation aiming to obtain a volume of data identical to the initial volume.

The stream transmitted to the user may be less precise during certain time intervals than the first stream. An indicator signaling the reconstructed sequences may be transmitted to the terminal of the user.

Although the present disclosure has been described with reference to one or more examples, workers skilled in the art will recognize that changes may be made in form and detail without departing from the scope of the disclosure and/or the appended claims.

The invention claimed is:

1. A method for transmitting, via a communication link of a network, a data stream containing a second ordered succession of digital values, said second ordered succession being determined from a first ordered succession of digital values respectively represented via a predefined number of bits, a sequence of consecutive digital values of the second ordered succession, called a second sequence, being obtained from a corresponding first sequence of consecutive digital values of the first ordered succession, wherein the method comprises the following acts, which are implemented by a transmitting device:

estimating, at a current time, a load value representative of a current load on said communication link of said network;

determining, depending on a result of a comparison between the estimated load value on said communication link of the network with at least one predefined threshold value, a second sequence to be transmitted in a predefined time interval following said current time, said second sequence being a corresponding first sequence of the first ordered succession or a modified sequence obtained by applying a selection law depending on the result of the comparison to the bits of said first sequence; and transmitting said second sequence and, in case of transmission of a modified sequence, transmitting a processing indicator signaling a sequence modification.

2. The transmitting method as claimed in claim 1, wherein said selection law defines at least one of a number of digital values or a number of bits of the digital values of the sequence to be transmitted.

3. The transmitting method as claimed in claim 1, wherein the applied selection law is chosen, depending on the estimated load value, from among a plurality of selection laws stored beforehand respectively in association with a criterion relative to at least one predefined threshold value.

4. The transmitting method as claimed in claim 1, wherein the second ordered succession is transmitted in the form of packets, a packet containing a header zone and a data zone, and wherein the digital values of the second sequence are included in the data zone and the processing indicator is included in the header zone.

5. The transmitting method as claimed in claim 1, wherein said processing indicator is transmitted in a signaling channel.

6. The transmitting method as claimed in claim 1, wherein the number of bits of the digital values of the second sequence is lower than the number of bits of the digital values of the first sequence and wherein the digital values of the second sequence contain the most-significant bits of the digital values of the first sequence.

7. The transmitting method as claimed in claim 1, wherein the estimating, determining and transmitting acts are reiterated.

8. A device for transmitting, via a communication link of a network, a data stream representing a second ordered succession of digital values, said second ordered succession being determined from a first ordered succession of digital values respectively represented via a predefined number of bits, a second sequence of consecutive digital values of the second ordered succession being obtained from a corresponding first sequence of consecutive digital values of the first ordered succession, wherein the device comprises:
a processor; and
a non-transitory computer-readable medium comprising instructions stored thereon which when executed by the processor configure the device to:
estimate, at a current time, a load value representative of a current load on said communication link of the network;
determine, depending on a result of a comparison between the estimated load value on said communication link of the network with at least one predefined threshold value, a second sequence to be transmitted in a predefined time interval following said current time, said second sequence being a corresponding first sequence of the first ordered succession or a modified sequence obtained by applying a selection law depending on the result of the comparison to the bits of said first sequence; and
transmit said second sequence and a processing indicator, in case of transmission of a modified sequence.

9. A method for obtaining a data stream representing a third ordered succession of digital values respectively represented by a predefined number of bits, wherein the method comprises the following acts, which are implemented by a receiving device:

receiving, via a communication link of a network, at least one second sequence of digital values of a data stream representing a second ordered succession of digital values and receiving, in case of reception of a modified sequence, at least one processing indicator signaling a sequence modification, said second sequence being determined depending on a result of a comparison between an estimated load value on said communication link of the network with at least one predefined threshold value, said second sequence being a first sequence of consecutive digital values of a first ordered succession of digital values respectively represented by said predefined number of bits or a sequence obtained by applying a selection law depending on the result of the comparison to the bits of said first sequence; and determining, depending on said at least one second sequence, at least one sequence of digital values of the third ordered succession, called the third sequence, said third sequence being the second sequence or a sequence obtained by applying, to the second sequence, a transformation depending on said processing indicator.

10. A device for obtaining a data stream representing a third ordered succession of digital values respectively represented via a predefined number of bits, wherein the device comprises:
a processor; and
a non-transitory computer-readable medium comprising instructions stored thereon which when executed by the processor configure the device to:
receive, via a communication link of a network, at least one second sequence of digital values of a data stream representing a second ordered succession of digital values and at least one processing indicator signaling a sequence modification, in case of reception of a modified sequence, said second sequence being determined depending on a result of a comparison between an estimated load value on said communication link of the network with at least one predefined threshold value, said second sequence being a first sequence of consecutive digital values of a first ordered succession of digital values respectively represented via said predefined number of bits or a sequence obtained by applying a selection law depending on the result of the comparison to the bits of said first sequence; and
determine, depending on said at least one second sequence, at least one sequence of digital values of a third ordered succession, called the third sequence, said third sequence being the second sequence or a sequence obtained by applying a transformation to the second sequence depending on said processing indicator.

11. The transmitting method as claimed in claim 1, wherein said selection law defines a number of digital values and a number of bits of the digital values of the sequence to be transmitted.

12. A method for transmitting, via a communication link of a network, a data stream containing a second ordered succession of digital values, said second ordered succession being determined from a first ordered succession of digital values respectively represented via a predefined number of bits, a sequence of consecutive digital values of the second ordered succession, called a second sequence, being obtained from a corresponding first sequence of consecutive digital values of the first ordered succession, wherein the method comprises the following acts, which are implemented by a transmitting device:
- estimating, at a current time, a load value representative of a current load on said communication link of said network;
- determining, depending on the estimated load value on said communication link of the network, a second sequence to be transmitted in a predefined time interval following said current time, said second sequence being a corresponding first sequence of the first ordered succession or a modified sequence obtained by applying a selection law to the bits of said first sequence, wherein the applied selection law is chosen, depending on the estimated load value, from among a plurality of selection laws stored beforehand respectively in association with a criterion relative to at least one predefined threshold value; and
- transmitting said second sequence and, in case of transmission of a modified sequence, transmitting a processing indicator signaling a sequence modification.

* * * * *